United States Patent [19]

Kameyama

[11] Patent Number: 5,257,054
[45] Date of Patent: Oct. 26, 1993

[54] FILM PRESSURE STRUCTURE FOR AN ELONGATED EXPOSURE STATION OF A CAMERA

[75] Inventor: Nobuyuki Kameyama, Tokyo, Japan
[73] Assignee: Fuji Photo Film Co., Ltd., Kanagawa, Japan
[21] Appl. No.: 924,474
[22] Filed: Aug. 4, 1992

[30] Foreign Application Priority Data

Aug. 5, 1991 [JP] Japan .................................. 3-69211

[51] Int. Cl.$^5$ ............................................. G03B 17/00
[52] U.S. Cl. .................................................. 354/203
[58] Field of Search ............... 354/110, 111, 112, 114, 354/115, 116, 117, 203

[56] References Cited

U.S. PATENT DOCUMENTS 2,680,400  6/1954  Smith ............................... 354/203 X
4,487,491 12/1984  Inaba ................................... 354/203

*Primary Examiner*—Michael L. Gellner
*Assistant Examiner*—Howard B. Blankenship
*Attorney, Agent, or Firm*—Young & Thompson

[57] ABSTRACT

A continuous taking camera, having eight consecutive exposure apertures, creates a picture frame having a size defined by alignment of two frames of 35 mm full size. Scenes for eight sub-frames are taken using the two full-size frames. Behind the exposure apertures, there are horizontally aligned two pressure plates each having a size corresponding to one frame of full size. When a photographic film is in the exposure station, the pressure plates hold the film flat. In a preferred embodiment, a spring plate biases the pressure plates to press the film. The pressure plates are retained on a rear door of the camera against the bias of the spring plate, so that the pressure plates are prevented from being dismounted from the rear door.

25 Claims, 5 Drawing Sheets

FILM PRESSURE STRUCTURE FOR AN ELONGATED EXPOSURE STATION OF A CAMERA

BACKGROUND OF THE INVENTION

1. Field of the Invention

The present invention relates to a structure for pressing photographic film in an exposure station in a camera, more particularly to a pressure structure for use in a camera having an exposure station that is elongated to create an elongated picture.

2. Description Related to the Prior Art

A conventional 35 mm camera has a single exposure aperture for creating a 36×24 mm picture, hereinafter referred to as full size, on a photographic film loaded in the camera. There has been proposed a camera which as an elongated exposure station having a size such that the longer side of the full size is further elongated for creating an elongated picture. An example of such a camera (called an elongated camera herein) is a 3D camera "NIM THROW" (trademark), manufactured by NIM THROW) in which a film is positioned in an exposure station twice as long as full size, and by which stereoscopic photographs are taken. The exposure station of this elongated camera has a pressure plate for holding the film flat in the focal plane in the exposure station over a length twice that of the pressure plate for the full size.

Recent compact cameras with a full-size exposure station have a plastic pressure plate because plastic is inexpensive and so helps reduce the manufacturing cost. This is in contrast to pressure plates for elongated cameras, wherein the pressure plate is a single plate of metal, e.g. aluminum. The metal of such a pressure plate is expensive to fabricate, as compared with the plastic material for the full-size pressure plate of a general-use camera.

It would be desirable to adopt plastic also as a material for a film pressure structure of an elongated camera. But if a single elongated pressure plate were made from plastic, it would be difficult for this pressure plate to hold the film sufficiently flat in the exposure station, due to its greater length.

OBJECTS OF THE INVENTION

In view of the foregoing problems, an object of the present invention is to provide a film pressure structure capable of holding photographic film sufficiently flat in an elongated exposure station.

Another object of the present invention is to provide a film pressure structure that is easy to assemble.

A further object of the present invention is to provide a film pressure structure of few parts.

Yet another object of the present invention is to provide a film pressure structure of which the same parts can be adapted to cameras that differ as to the size of the exposure station.

SUMMARY OF THE INVENTION

In order to achieve the above and other objects and advantages of this invention, an elongated camera, which creates on a photographic film a picture having a size whose length is equal to N frames of full size (N being an integer equal to at least 2), is provided with a film pressure structure disposed behind the exposure station for holding the film flat in the exposure station, this structure being constituted by N pressure plates in alignment, each having a size corresponding to one frame of full size.

The novel elongated structure constituted by component pressure plates of plastic material is advantageous in that it has only a small cost of manufacture, in a manner similar to the general type of compact camera in use with a single full-size pressure plate. Because the component pressure plates are as large as that for the 35 mm full size, it is easy for the component pressure plates to hold the film sufficiently flat in the elongated exposure station. The component pressure plates can be formed identical in shape for respective areas of full size, whereby the number of different kinds of parts is not greater than for a conventional elongated camera. These same parts can be used for any elongated camera having an exposure station a plurality of times as long as the full size, and also for a camera having a full-size exposure station.

BRIEF DESCRIPTION OF THE DRAWINGS

The above and other objects and advantages of the present invention will become more apparent from the following detailed description when read in connection with the accompanying drawings, in which.

DETAILED DESCRIPTION OF THE INVENTION

Figure 1:
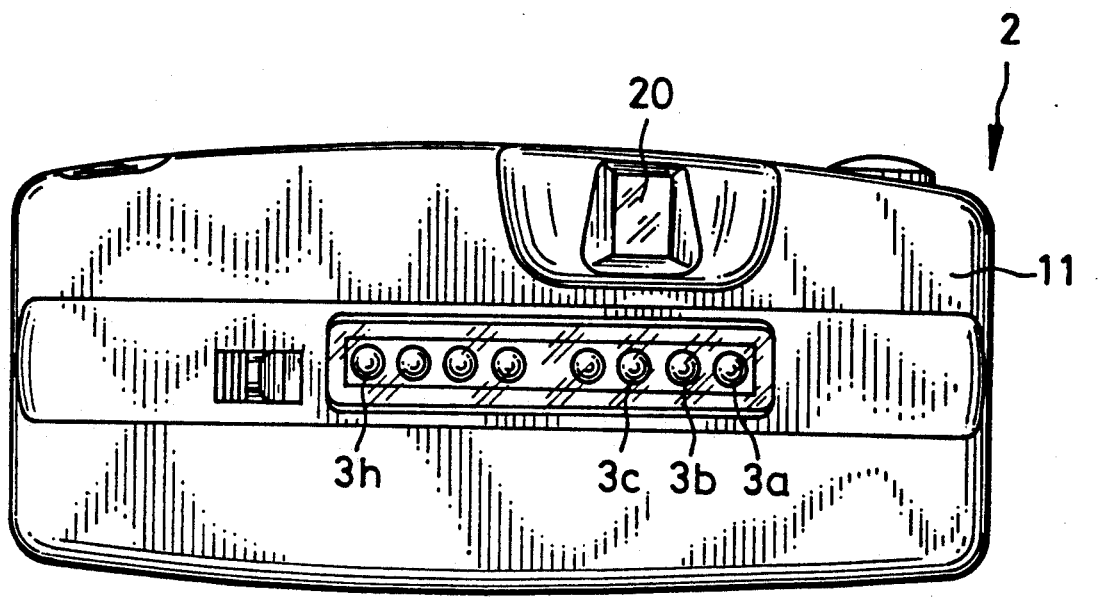
FIG. 1 is a front view illustrating a continuous taking camera in which a film pressure structure according to the present invention is incorporated.
Figure 2:
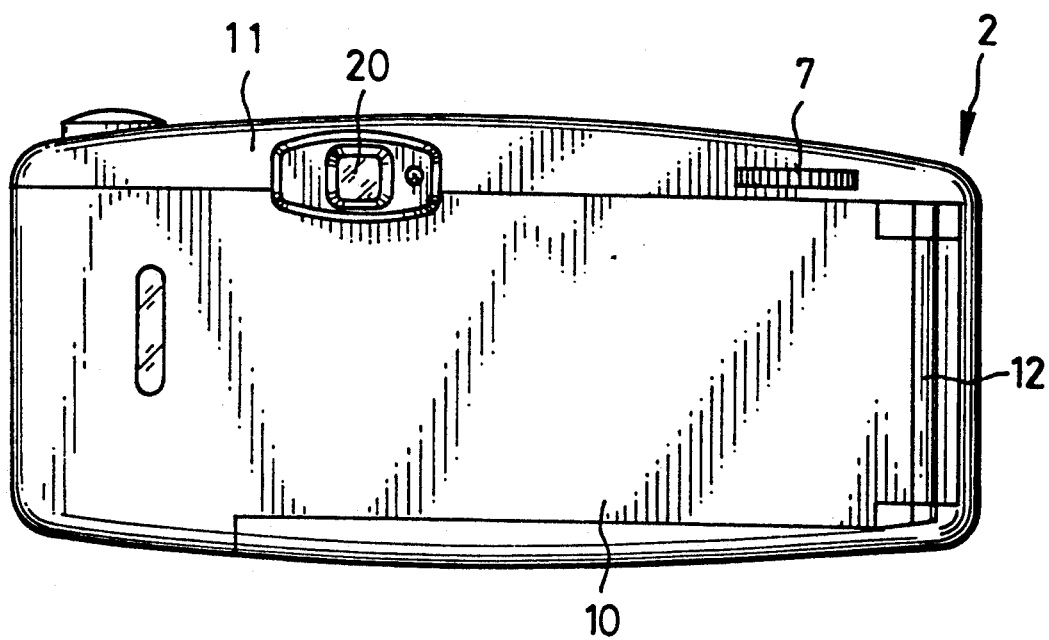
FIG. 2 is a rear view thereof.
Figure 3:
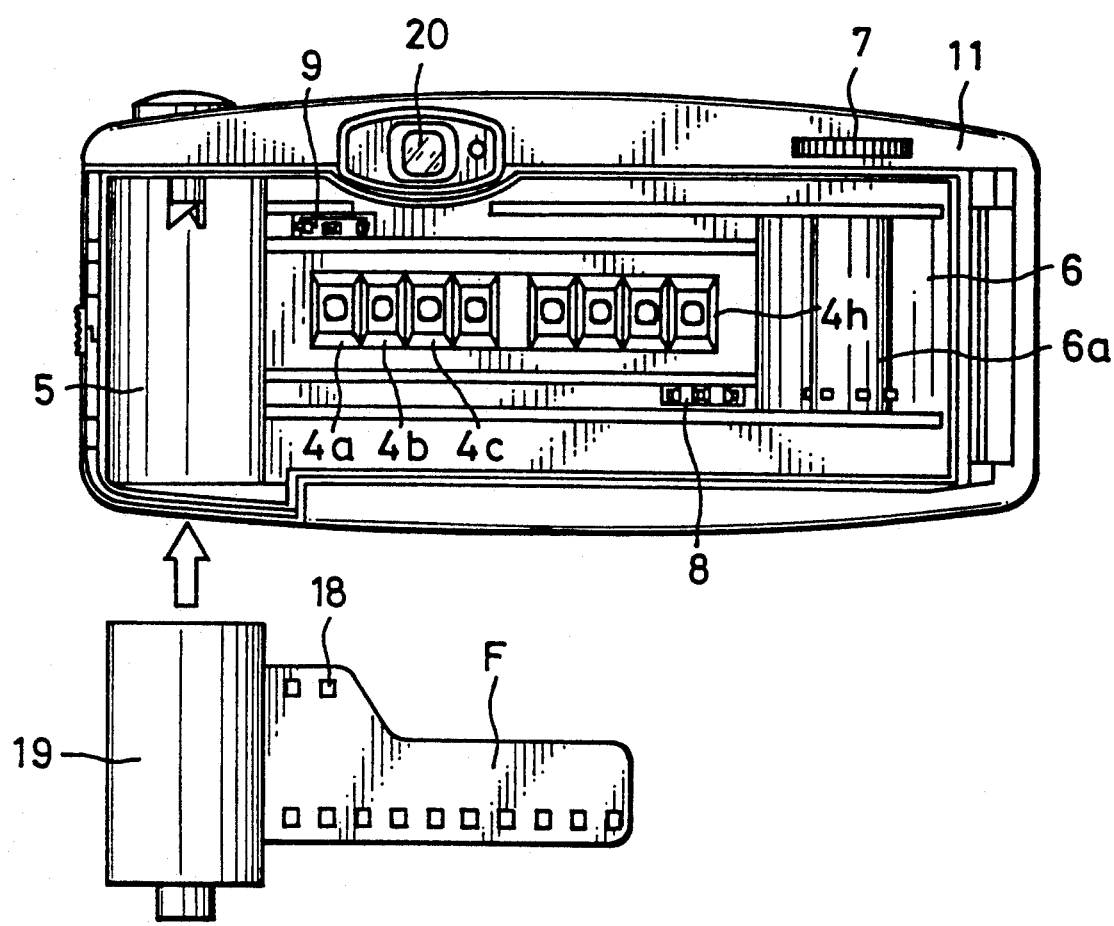
FIG. 3 is an exploded rear view thereof, with the rear door removed, together with a photographic film.

FIGS. 1 to 3 generally illustrate a continuous or consecutive taking camera 2 in use with novel film pressure plates. The camera 2 has eight taking lenses 3a, 3b, 3c, . . . , 3h. A rear door 10 is openably hinged to a body 11 of the camera 2 via a hinge 12. Removal of the door 10 exposes the interior of the camera 2 as illustrated in FIG. 3. Eight exposure apertures 4a, 4b, 4c, . . . , 4h are disposed behind the taking lens 3a to 3h, in alignment with which there are disposed horizontally a cassette receiving chamber 5 and a film take-up chamber 6. When a film advancing wheel 7 is rotated manually of the user, a driving sprocket wheel 8, disposed in registry with perforations 18 of a photographic film F, rotates to advance the film F toward a film take-up spool 6a, which is also being rotated to wind up the film F, to position the unexposed film F behind the exposure apertures 4a to 4h after withdrawal from a cassette 19 in the cassette receiving chamber 5. A driven sprocket wheel 9 is engaged with the perforations 18 and rotated by the film F as the latter advances, to measure the advance of the film F. Reference numeral 20 designates a viewfinder.

The length of the film F disposed behind the eight apertures 4a to 4h of the present continuous taking camera 2 corresponds to two frames of 35 mm full size.

The exposure station constituted by the eight exposure apertures 4a to 4h has a range which is one half as wide and twice as long as full size, i.e. twice panoramic size, because the upper and lower quarters of a frame of full size are masked during exposure. Each of the sub-frames as created by the respective exposure apertures 4a to 4h is centered relative to the width of the film F. The exposure apertures 4a to 4h are adapted to create eight sub-frames on the film F consecutively upon one operation of releasing the shutter mechanism. The shutter mechanism is adapted to pass light through the lenses 3a to 3h to the film F in a time-sequential manner, so that scenes for eight sub-frames are taken using the two full-size frames. All the film having been exposed, the film is then subjected to panoramic printing so as to obtain photographs wherein two consecutive photoprints constitute a series of consecutive scenes appearing in eight sub-frames.

Figure 4:
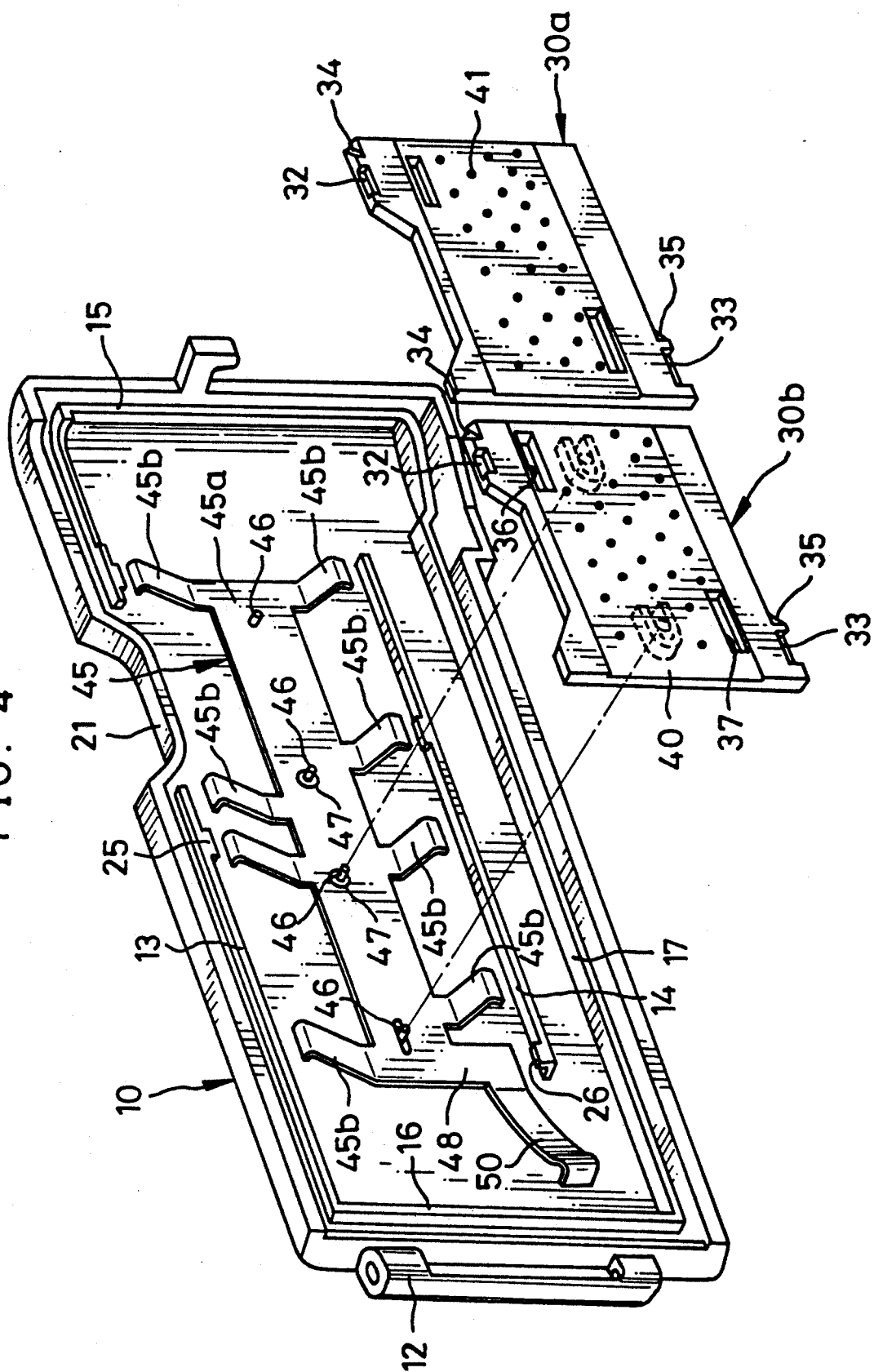
FIG. 4 is an exploded perspective view of the novel film pressure structure.
Figure 5:
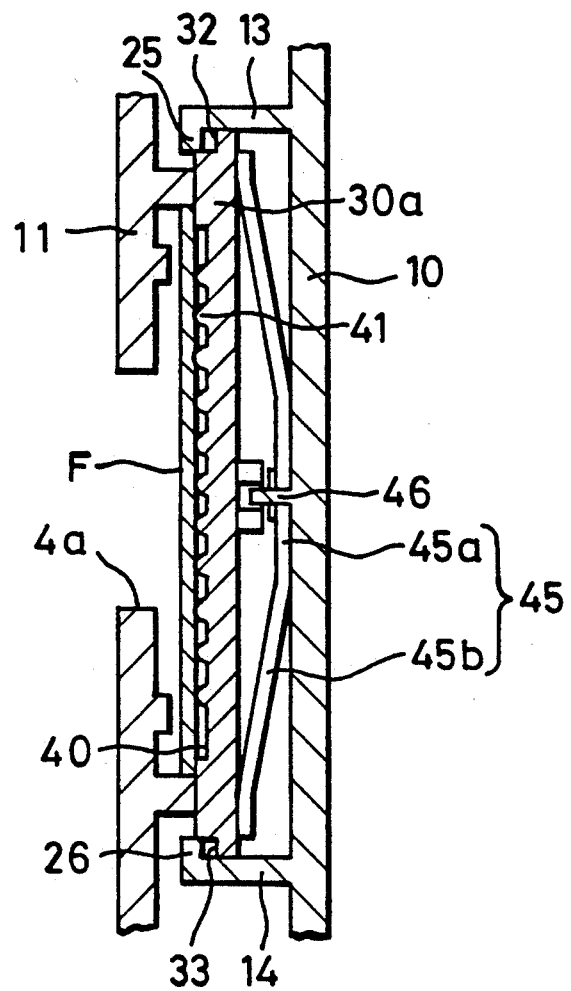
FIG. 5 is a cross section of the novel film pressure structure.

Referring to FIGS. 4 and 5, the rear door 10 has a pair of rails 13 and 14 for mounting component pressure plates 30a and 30b on the inside of the rear door 10. Lateral ridges 15 and 16 and a lower ridge 17 are formed along the peripheral edges of the door 10 in continuation of the upper rail 13 and are adapted to shield reliably the periphery of the door 10 from light. The rear of the camera body 11 is provided with a packing (not shown) to be tightly received in the gap between the door edges and the rail 13 and ridges 15 to 17 so as to prevent light from entering the camera through the rear of the camera 2.

A recess 21 is formed in the upper edge of the door 10 for receiving the viewfinder 20 and makes it possible to reduce the height of the camera. On the rails 13 and 14 are formed claws 25 and 26 that project toward the middle of the door 10.

The pressure plates 30a and 30b are substantially as long as a frame of the full size and as wide as the interval between the rails 13 and 14. A pair of recesses 32 and 33 are formed in the upper and lower edges of the plates 30a and 30b in a diagonal disposition, in order to receive the claws 25 and 26, which are engaged with the recesses 32 and 33 to retain the plates 30a and 30b between the rails 13 and 14. Inclined surfaces 34 and 35 are formed on the plates 30a and 30b in association with the recesses 32 and 33 on the same side, or the side of the cassette receiving chamber 5, relative to the lengthwise direction of the plates 30a and 30b. The inclined surfaces 34 and 35 make it easy to mount the plates 30a and 30b on the door 10.

In each of the plates 30a and 30b is formed a slot 36 in which the drive sprocket wheel 9 is receivable when the door 10 is closed to press the film F against the exposure apertures 4a to 4h. In the plates 30a and 30b is formed a slot 37 in which the driving sprocket wheel 8 is receivable. A contact surface 40 of the pressure plates 30a and 30b has a size to press one frame, has a level slightly lowered from the front side and is provided with a great number of minute projections 41 formed by an embossing treatment, such that they reduce the resistance of the film F to the contact surface 40.

A spring plate 45 is secured to the rear door 10 between the rails 13 and 14, and is positioned by positioning projections 46. Ring 47 are fitted on the projections 46 to secure the spring plate 45 to the rear door 10. The spring plate 45 has a central portion 45a and eight spring leg portions 45b extending therefrom into contact with corner portions of the pressure plates 30a and 30b. An end 48 of the spring plate 45 on the side of the film take-up chamber 6 is integrated with a film guide 50, which guides the advancing film F by pressing it against the take-up spool 6a. The film portion pressed by the film guide 50 is the lower side of a frame of the full size. Although the pressing force of the film guide 50 cannot be changed to effect a fine adjustment of the pressure between the film guide 50 and the film F, the horizontal edge portions of the full-size film frame resist such an excess pressure as is caused by a metal plate as thick as the springs legs 45b. This is because the edge portions are not used for recording a picture frame of the panoramic size, of which the continuous taking camera 2 takes advantage.

Figure 6A:
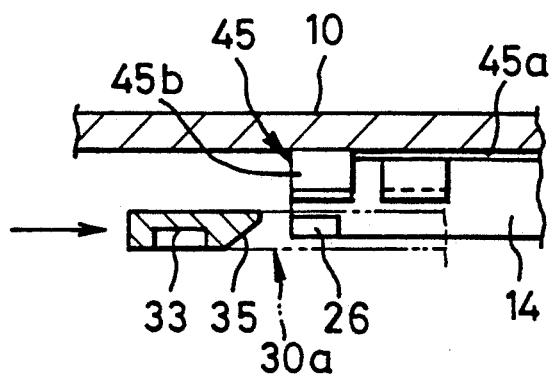
FIGS. 6A and 6B are explanatory views illustrating a process of assembling the film pressure structure.
Figure 6B:
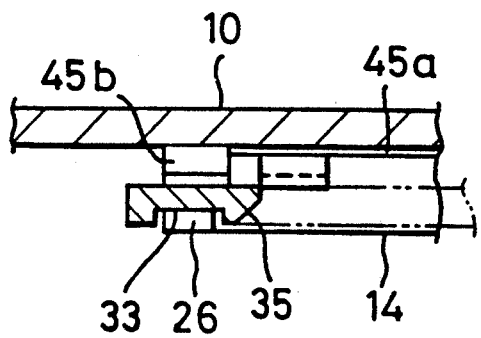

The operation of assembling the pressure plates 30a and 30b into the film pressure structure will now be described, particularly referring to FIGS. 6A and 6B. As a first step, the plate 30a is fitted between the rails 13 and 14 in the position slightly offset from the position of retention adjacent the hinge 12 and so is displaced leftward in FIGS. 4 and 6A. The plate 30a is then slid rightward to the position of retention. During this sliding movement, the claws 25 and 26 abut the inclined surfaces 34 and 35 until they pass over the latter and in turn are engaged in the recesses 32 and 33, as illustrated in FIG. 6B. The spring plate 45 presses the claws 25 and 26 against the inner sides of the recesses 32 and 33, so that the plate 30a is fixedly retained between the rails 13 and 14. The second plate 30b is then similarly assembled on the rear door 10, to complete the assembly of the film pressure structure.

When the camera 2 is in use, it is loaded with the film F, which is kept flat in a focal plane or exposure station of the camera 2, pressed by the plates 30a and 30b when the rear door 10 is closed. Some teeth of the sprocket wheel 8 are received in the slot 37 in the second plate 30b, some teeth of the sprocket wheel 9 being received in the slot 36 in the first plate 30a. Although the slot 36 in the second plate 30b and the slot 37 in the first plate 30a are not in use, they enable the two plates 30a and 30b to be identical in the shape. The novel pressure plate, therefore, can be used with an ordinary camera of which the exposure station is as long as the full size, or a camera in which the film is positioned in an exposure station three or more times as long as an ordinary camera.

Note that the upper edge of the first plate 30a has a shape exactly fitting the recess 21. The upper edge of the second plate 30b is formed in the same shape as that of the first plate 30a, so that the two plates 30a and 30b can be conveniently produced in a single process.

Figure 7:
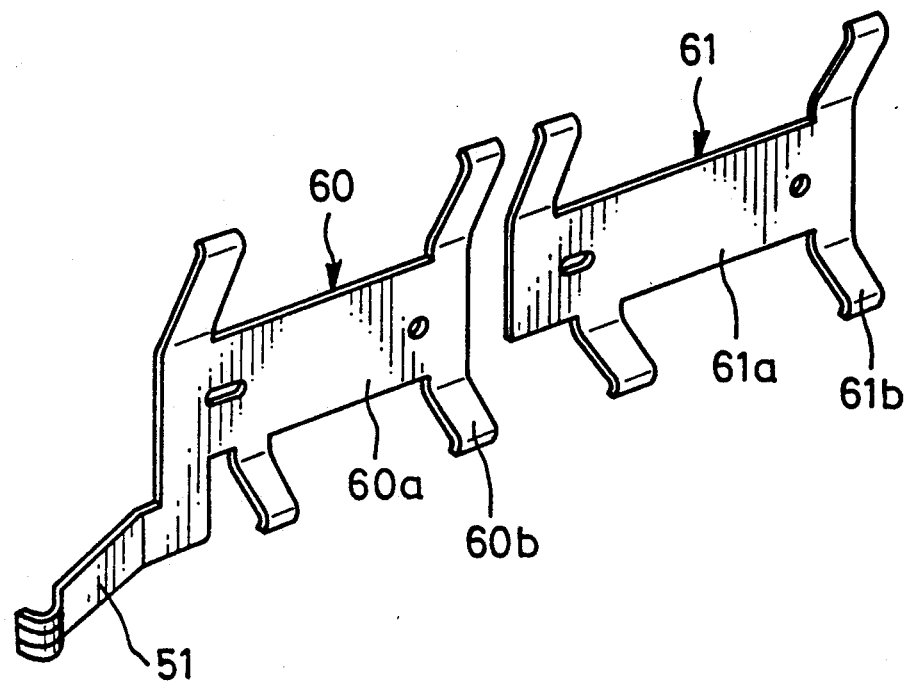
FIGS. 7 and 8 are perspective views of other preferred embodiments of spring plates of the novel film pressure structure.
Figure 8:
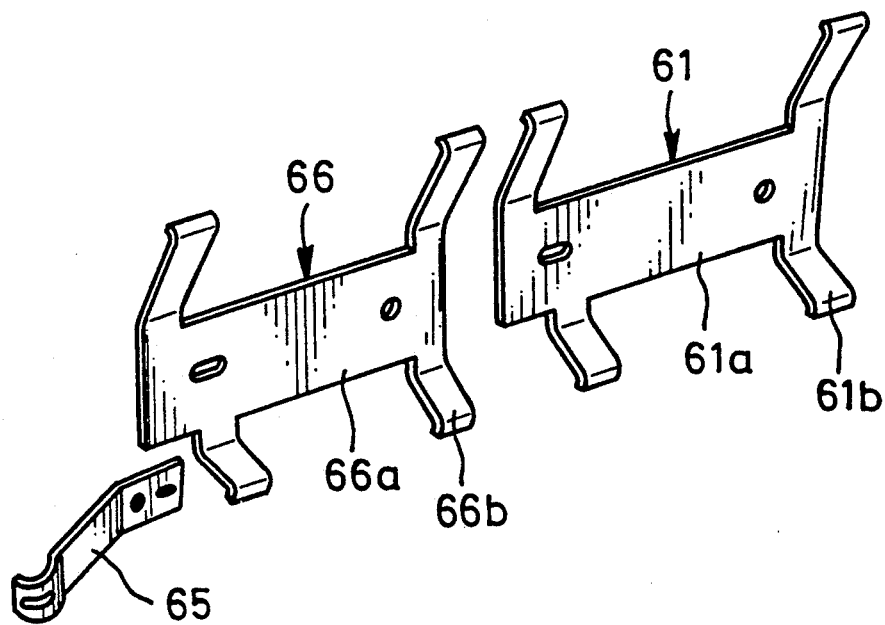

Although the plates 30a and 30b are pressed by the single spring plate 45 which is longer than in the prior art, the plates 30a and 30b may instead be pressed by two individual spring plates 60 and 61 as illustrated in FIG. 7. The spring plate 60 has a central portion 60a, four spring legs 60b and a film guide 51, while the spring plate 61 has a central portion 61a and four spring legs 61b. Although the film guide 51 is integrated with the spring plate 60 in FIG. 7, a film guide 65 as illustrated in FIG. 8 may be separate from the spring plate 66. Reference numeral 66a designates a central portion, 66b designating four spring legs. The construction of FIG. 8 is advantageous not only in that the spring plates 61 and 66 can be produced in the identical shape, but also in that the film guide 65 can be thinner than the spring plate 66. It is preferable to finely adjust the force with which a film guide presses on the film F because excessive force might cause scratches on the film F. The separate construction of the film guide 65 from the spring plate 66, however, makes it easy to select a film guide 65 of an appropriate thinness.

The present invention is applicable, not only to a structure in which one or two spring plates are secured to the rear door 10, but also to a structure in which one or two spring plates are secured to the rear surface of the pressure plates 30a and 30b.

Although the present invention has been fully described by way of preferred embodiments thereof with reference to the accompanying drawings, various changes and modifications will be apparent to those having skill in this field. Therefore, unless otherwise these changes and modifications depart from the scope of the present invention, they should be construed as being included therein.

What is claimed is:

1. In an elongated camera for creating a picture on a photographic film in an exposure station, said picture frame having a size defined by alignment of N frames of a full size, N being an integer which is at least 2, and a film pressure structure disposed behind said exposure station for holding said film flat in said exposure station; the improvement wherein said film pressure structure comprises N pressure plates each having a size corresponding to one frame of said full size.

2. A film pressure structure as defined in claim 1, wherein said camera includes a camera body having means for taking photographs and a rear door openably mounted thereon, said film pressure structure being mounted on an inner side of said rear door.

3. A film pressure structure as defined in claim 2, further including biasing means disposed between said rear door and said pressure plates for biasing said pressure plates to press said film.

4. A film pressure structure as defined in claim 3, further including retaining means for retaining said pressure plates on said rear door in order to maintain said pressure plates subject to a bias of said biasing means so as to prevent said pressure plates from being dismounted from said rear door.

5. A film pressure structure as defined in claim 1, wherein said N pressure plates are formed in an identical shape.

6. A film pressure structure as defined in claim 1, wherein said pressure plates are each a one-piece plastic molding.

7. A film pressure structure as defined in claim 4, wherein said retaining means is formed integrally with said rear door.

8. A film pressure structure as defined in claim 7, wherein said retaining means includes:
a pair of rails formed to project from said inner side of said rear door to extend along a pair of horizontal edges of said N pressure plates; and
N pairs of claws formed to project from edges of said respective rails for contacting a front of said pressure plates in order to keep said pressure plates disposed between said rails.

9. A film pressure structure as defined in claim 3, wherein said biasing means is at least one spring plate member having a plurality of spring leg portions for pressing the vicinity of four corners of each of said pressure plates.

10. A film pressure structure as defined in claim 9, wherein said spring plate member is secured to said rear door.

11. A film pressure structure as defined in claim 9, wherein said spring leg portions are inclined forwardly toward said pressure plates.

12. A film pressure structure as defined in claim 8, wherein recesses are formed in front surfaces of said pressure plates for receiving said claws to prevent said pressure plates from being dismounted from between said rails.

13. A film pressure structure as defined in claim 12, wherein said pairs of claws are formed in a diagonal disposition relative to said pressure plates.

14. A film pressure structure as defined in claim 13, wherein each of said pressure plates includes:
a pair of projecting portions formed to project vertically from horizontal edges of said pressure plates, in each of which projecting portions a said recess is formed; and
inclined surfaces formed on said projecting portions to come into contact with said claws while said claws are inserted into said recesses in order to guide said claws into said recesses in response to sliding of said pressure plates, thereby to facilitate assembly of said pressure plates.

15. A film pressure structure as defined in claim 9, there being but a single said spring plate member.

16. A film pressure structure as defined in claim 15, wherein a film guide projects from a said spring plate member for guiding said film toward a take-up spool of said camera for taking up said film.

17. A film pressure structure as defined in claim 11, there being N said spring plate members each of which has four of said spring leg portions.

18. A film pressure structure as defined in claim 17, wherein a film guide projects from a spring plate member close to a film take-up spool for guiding said film toward said take-up spool.

19. A film pressure structure as defined in claim 17, wherein said N pressure plates are identical in shape.

20. A film pressure structure as defined in claim 19, wherein a film guide is secured to said rear door for guiding said film toward a take-up spool of said camera for taking up said film.

21. A film pressure structure as defined in claim 1, wherein said pressure plates have a contact surface for confronting a rear surface of said film, and a large number of minute projections formed on said contact surface for reducing resistance in contact with said film.

22. A film pressure structure as defined in claim 1, wherein:
said exposure station has a plurality of exposure apertures; and
said camera is a continuous taking camera in which one operation of releasing a shutter mechanism causes said exposure apertures to effect a time-sequential exposure of said film.

23. A film pressure structure as defined in claim 1, wherein said exposure station has an area equal to two frames of a full size and upper and lower quarters of said full size are masked, said exposure station thereby providing two picture frames of panoramic size, and said panoramic size frames are each constituted of four subframes.

24. A film pressure station as defined in claim 1, wherein said camera includes:
a first sprocket wheel disposed to project partly into said exposure station in a position for engagement with perforations in said film in said exposure station, said first sprocket wheel being close to a take-up spool for said film and advancing said film toward said take-up spool in response to a manual operation of winding up said film; and a second sprocket wheel disposed to project partly into said exposure station in engagement with said perforations in said film, said second sprocket wheel being close to a receiving chamber of said camera for receiving a film cassette, and said second sprocket wheel measuring advance of said film by being rotated with said film as said film advances; and said pressure plates include:

first and second slots formed in correspondence with said first and second sprocket wheels, in which slots projecting portions of said sprocket wheels are disposed.

25. A film pressure structure as defined in claim 24, wherein said first and second slots are formed in a diagonal disposition relative to a contact surface of said pressure plates confronting said film.

* * * * *